United States Patent [19]

Vaseen

[11] 4,218,518

[45] Aug. 19, 1980

[54] FUEL CELL USE OF GASEOUS FUELS AND OXYGEN PROVIDED AT ELECTRODE ABSORBED IN LIQUID DIELECTRIC

[76] Inventor: Vesper A. Vaseen, 9840 W. 35th Ave., Wheatridge, Colo. 80033

[21] Appl. No.: 4,067

[22] Filed: Jan. 17, 1979

[51] Int. Cl.$^2$ ............................................. H01M 8/06
[52] U.S. Cl. .......................................... 429/14; 429/17
[58] Field of Search ..................... 429/13, 14, 15, 101, 429/105, 17

[56] References Cited

U.S. PATENT DOCUMENTS

| | | | |
|---|---|---|---|
| 2,070,612 | 2/1937 | Niederreither | 429/15 |
| 3,540,934 | 11/1970 | Boeke | 429/101 |
| 3,589,944 | 6/1971 | Stanimirovitch et al. | 429/14 |
| 3,769,090 | 10/1973 | Katz et al. | 429/14 |

*Primary Examiner*—Donald L. Walton

[57] ABSTRACT

A fuel cell is an electrochemical device composed of a nonconsumable anode and cathode, an electrolyte, fuel and controls, the maximum current density that can be passed depends upon the rate of mass transfer of atoms and their respective electrons. This invention improves the rate of mass transfer by submerging the "oxygen" contact electrode in a dielectric liquid saturated with absorbed oxygen, and when using a gaseous fuel, submerging the "hydrogen" contact electrode in a dielectric liquid saturated with the absorbed gaseous fuel. The invention uses a liquid dielectric which is nonmiscible with water, thus as water is formed at either electrode, the water is immediately rejected from the electrode/dielectric contact and being equally rejected by the dielectric is removed from interfering or resisting current flow, thus further improving the efficiency of the fuel cell.

4 Claims, 2 Drawing Figures

FUEL CELL USE OF GASEOUS FUELS AND OXYGEN PROVIDED AT ELECTRODE ABSORBED IN LIQUID DIELECTRIC

BACKGROUND OF THE INVENTION

Previous inventions of the inventor have led to a series of inventions having to do with the actions of paramagnetic materials, particularly gases when dissolved or absorbed in non-dielectric magnetic inert liquids. Study of the fuel cell now shows that the liquid electrolyte type fuel cell is improved by application of some of these same inventions.

DESCRIPTION OF PRIOR ARTICLE

The first recorded history of an operating fuel cell was disclosed when Sir Humphrey Davy in 1802 built a cell with carbon electrodes and nitric acid electrolyte. The first hydrogen-oxygen cell was operated by Sir William Grove in 1839.

By 1959, F. T. Bacon and J. C. Frost of Cambridge University built and demonstrated a 6 KW fuel cell unit. Also in 1959 H. K. Ihrig of American Allis-Chalmers demonstrated their 20 HP fuel cell tractor. Since 1959 numerous operating fuel cells of various types have been reasonably successfully used.

Fuel cells can be classified as high, medium and low temperature. High temperature cells are typified by use of molten salt electrolytes: (1000°-1200° F.). Medium temperature by such as the "Bacon" hydrogen-oxygen cell (400° F.); and low temperature any number of systems of hydrogen-oxygen that operate up to the boiling point of the particular electrolyte. Electrolytes are also designated as acid or basic salts. Fuel cells are also classified by the form of fuel. Gaseous fuel is typified by hydrogen, liquid by alcohol and solids by coal or metals. Oxidants for use in cells of all types are in general limited to oxygen, air, and hydrogen peroxide.

The advantage of the fuel cell is that chemical energy is converted directly into electricity without a preliminary conversion to heat. Consequently, the conversion is not subject to the limitations of the Carnot cycle, and thermal efficiencies of as high as 90% are theoretically possible.

Due to the low thermal voltage of individual cells it is necessary to connect a number of cells in series to obtain desired voltages.

Manufacturing costs of fuel cells is low as compared to engines. There are no moving parts hence sealing problems are minimal.

Both fuel and oxidant manifolds and diffusers are amenable to mass production from low cost materials.

Most fuel cells present little or no maintenance problems.

Performance of fuel cells systems is often defined in terms of power per unit of volume and per unit of weight, both vs. time. In this regard fuel cells require more volume and are heavier than most other energy producers.

Fuel cells are noiseless, low heat loss, clean, with non-objectionable products of combustion carbon dioxide, nitrogen and water.

Fuel cells only consume fuel when power is drawn from the system.

This invention is principally involved with the control of the polarization of the oxygen or oxidant electrode in a manner which improves the cell conversion of oxygen to water, thus the overall increased cell efficiency; also similarly the hydrogen electrode.

REFERENCES

U.S. Patent Documents

| 341,727 | 5/1886 | Cabell | 210/243 |
|---|---|---|---|
| 1,056,043 | 3/1913 | Morrison | 55/3 |
| 1,056,244 | 3/1913 | Wiley | 55/68 |
| 1,722,458 | 7/1929 | DeBaupre | 55/68 |
| 3,177,633 | 4/1965 | McDonald, Jr. | 55/3 |
| 3,762,133 | 10/1973 | Merriman, et al. | 55/08 |
| 4,049,398 | 9/1977 | Vaseen | 55/36 |

U.S. Patent Applications Allowed but not Issued to Date

| 826,684 | 8/22/77 | Vaseen | U.S. Pat. No. 4,140,608 |
|---|---|---|---|
| 875,739 | 8/12/77 | Vaseen | U.S. Pat. No. 4,139,596 |
| 875,740 | 9/30/78 | Vaseen | U.S. Pat. No. 4,139,595 |
| 890,822 | 9/30/78 | Vaseen | U.S. Pat. No. 4,142,874 |
| 891,548 | 10/23/78 | Vaseen | U.S. Pat. No. 4,150,956 |

U.S. Patents-Applied for

| 828,956 | 8/29/77 | Vaseen |
|---|---|---|
| 948,588 | 10/4/78 | Vaseen |
| 951,231 | 10/13/78 | Vaseen |

SUMMARY OF THE INVENTION

The description of the process hereafter concerns itself with the electrochemical reactions of, probably the simplest fuel cell, the hydrogen-oxygen fuel cell. The principals involved with the disclosures in this invention are applicable to many types of fuel cell configurations, types of fuels, and temperature and pressure combinations. It is the intent of this disclosure of method principals and process to improve the efficiency of these as well by the application of similar process modifications.

Although the disclosure herein may refer to types and kinds of electrodes in explaining this invention it is not the intent herein to fix or apply this process improvement to these, but only to simplify the explanation.

This invention is concerned only with absorbing the gaseous oxygen in an inert, dielectric liquid which then retains the molecular and atomic oxygen absorbed therein against the electrode thus permitting a transfer of oxygen to the electrolyte at a controlled rate as well as refusal of transfer of the inert dielectric carrier liquid due to the molecular size of the dielectric liquid molecules in regard to the size of the oxygen molecules and electrode pores.

When gaseous hydrogen or other gas is used as the fuel, then likewise this invention concerns itself with absorbing the gaseous hydrogen or other fuel in an inert dielectric liquid which retains the molecular and atomic hydrogen or other gas absorbed therein against the electrode thus permitting a transfer of hydrogen and electrons to the electrolyte at a controlled rate as well as refusal of transfer of the inert dielectric carrier liquid due to the molecular size of the dielectric liquid molecules in regard to the size of the hydrogen molecules and electrode pores.

Cell operation (FIG. 1) consists of a compartment within which the hydrogen bearing fuel (18) is contained, or circulated (19) through, which also has current collection electrodes (3)(4). The nozzles (5)(6) are used to conduct the flow into and out of the fuel cell. The example herewith uses diffusion electrodes (3). The electrodes are connected by a group of collectors (4) to the terminal lead (20) which is the negative terminal. Surrounding or contacting the hydrogen electrode (3) is the compartment (2) which retains the electrolyte used. Circulation of the electrolyte can be either current or counter current with the fuel flow (18)(19). In this example the electrolytic flow is shown counter current (10)(8), via conductor nozzles (9)(7). The electrolyte contacts both the hydrogen electrode (3) and the oxygen electrode (12). The oxygen electrode is similar to the hydrogen electrode adjacent or in some manner contacted with a current collector (11) which in turn is connected to a terminal (21) which is the positive terminal. The description of the cell to this point is no different than most cells constructed for many years, and no specific claim is made herein to this configuration or their reactions.

This invention discloses the art and science of introducing oxygen to the oxygen electrode by absorbing non-ionic molecules and atoms of gaseous oxygen in an inert, dielectric liquid, such as a polyorganosiloxane or fluorocarbon and thus providing a means of placing against the oxygen electrode a controlled designed density of non-ionic oxygen, molecules and atoms from a liquid which does not enter into any chemical reactions and thus doesn't produce water or other inhibiting or diluting molecule, or compound against the electrode surface or within the body of the liquid. It is therefore necessary to encompass this oxygen carrier liquid in a compartment (13) in a manner which will contact it with the oxygen electrode. Although it is possible to circulate the oxygen carrier liquid current or countercurrent to the "hydrogen" bearing fuel flow; it is in the example herewith described as counterflow or upflow (14) (17), through conductor nozzle (15)(16) makes it easier to remove from the cell the water formed by electrochemical reactions, due to its immiscibility with the inert dielectric liquid, is rejected from the substrate liquid and with the selection of a dielectric liquid with a specific gravity greater than one, floats the liquid to the top surface. Thus the liquid matter is continually removed from the cell.

When a gaseous fuel is used such as hydrogen ($H_2$) gas, carbon dioxide ($CO_2$) gas, methane ($CH_4$) gas; etc., then it also is absorbed in an inert dielectric liquid and recirculated (18)(19) through the cell. Here again, although flow is shown in FIG. 1, the example as down flow through the cell, it can be reversed to upflow thus also removing nonmiscible water formed from electrochemical reactions from the cell.

The explanation above is not to be assumed the hydrogen fuel must with this invention always be absorbed as a gas in an inert dielectric liquid. Not only is it possible to use the gaseous fuels with the oxygen carrier liquid side of the cell, but it is possible to use the liquid fuels in concert with the absorbed oxygen in an inert, dielectric liquid.

Potential fuels for the fuel cell are any chemical or combination thereof with electrochemical reactions. Some of the more probable are:

| Fuel | AMPS/$\pi^2$ | Expected Voltage vs. Theoretical with $O_2$ |
|---|---|---|
| Hydrogen | 100 | 0.7 |
| Formaldehyde | 50 | 0.6 |
| Ethanol | 35 | 0.5 |
| Methanol | 30 | 0.4 |
| Propanol | 16 | 0.4 |
| Butanol | 16 | 0.4 |
| Propylene | 15 | 0.5 |
| Butylene | 15 | 0.5 |
| Sec. Butanol | 10 | 0.3 |
| Sec. Propanol | 8 | 0.3 |
| Tert Amyl Alcohol | 6 | 0.3 |
| Butane | 5 | 0.3 |
| Ethane | 3 | 0.3 |
| Tert Butanol | 2.5 | 0.3 |
| Methane | 2 | 0.2 |

Representative standard E.M.F. and heretofore expected efficiency of different fuel cell reactions is as follows:

| Reaction | Temperature | Ideal Eff. | Prior Systems | Dielectric Gas Carrier |
|---|---|---|---|---|
| $H_2 + \frac{1}{2} O_2 \rightarrow H_2O$ (liquid) | 25° C. | 0.94 | | 1.23 |
| $H_2 + \frac{1}{2} O_2 \rightarrow H_2O$ (gas) | 25° C. | 0.94 | | 1.19 |
| $H_2 + \frac{1}{2} O_2 \rightarrow H_2O$ (gas) | 700° C. | 0.78 | | 1.00 |
| $C + O_2 \rightarrow CO_2$ | 25° C. | 1.00 | | 1.03 |
| $C + O_2 \rightarrow CO_2$ | 700° C. | 1.00 | | 1.03 |
| $CO + \frac{1}{2} O_2 \rightarrow CO_2$ | 25° C. | 0.91 | | 1.34 |
| $CO + \frac{1}{2} O_2 \rightarrow CO_2$ | 700° C. | 0.69 | | 1.01 |
| $CH_4 + 2O_2 \rightarrow CO_2 + 2H_2O$ | 25° C. | 0.92 | | 1.05 |
| $CH_4 + 2O_2 \rightarrow CO_2 + 2H_2O$ | 700° C. | 0.90 | | 1.04 |
| $C_3H_8 + 5O_2 \rightarrow 3CO_2 + 4H_2O$ | 25° C. | 0.95 | | 1.09 |
| $C_3H_8 + 5O_2 \rightarrow 3CO_2 + 4H_2O$ | 700° C. | 0.97 | | 1.11 |

The above illustrates that the entropy change is also a function of temperature. The increase in working temperature raises the efficiency of a heat engine; but fuel cells of the hydrogen-oxygen type there is a higher potential and a greater efficiency at lower temperatures.

FIG. 2 is included to illustrate a simplified flow sheet both with (30) the production of oxygen gas by U.S. Pat. No. 4,049,398 (Vaseen) and with use of purchased or externally supplied oxygen gas (31).

The fuel cell (33) is filled (34) with the selected electrolyte based on the selection of hydrogen gas as the fuel and oxygen as the oxidant. The oxygen gas either from on site production (30) or supply (31) is absorbed into a selected inert, dielectric liquid represented by inductor (32) from a reservoir represented by (47) and transfer pump (51). The inert dielectric liquid, saturated with absorbed oxygen (32) is circulated through the compartment (52) of the cell designed for this purpose. The circulation through the cell (33) by means of compartment (52) returns the liquid to a water separator (46) thence back by pump (51) for recycle.

This illustration using hydrogen gas as the fuel (37) inducts, as represented (38) the hydrogen gas into the selected inert, dielectric liquid as transformed from reservoir, represented (41) by pump (45) to the fuel compartment of the cell (39). The inert dielectric, saturated with hydrogen gas is recycled through the cell

(33) and returned to the water separator (40) for recycle.

The cell is now ready to produce an electrical current flow and voltage across the positive terminal (56) and negative terminal (55); as current is collected in the cell from electrodes, (54) and (53).

The electrolyte is now recirculated by pump (36) to reclamation and quality control (35) for recycle.

Water produced in the cell (33) at the oxygen electrode and rejected from the dielectric liquid is separated (48) from the liquid at separator (46) illustrated herein as with a specific gravity lighter than the dielectric and rising to float (49) where it is removed to waste or disposal (50).

Water produced in the cell (33) at the hydrogen electrode and rejected from the dielectric liquid is separated (42) from the liquid at separator (40) also illustrated herein as a specific gravity lighter than the dielectric and rising to float (43) where it is removed to waste or disposal (44).

Figure 1:
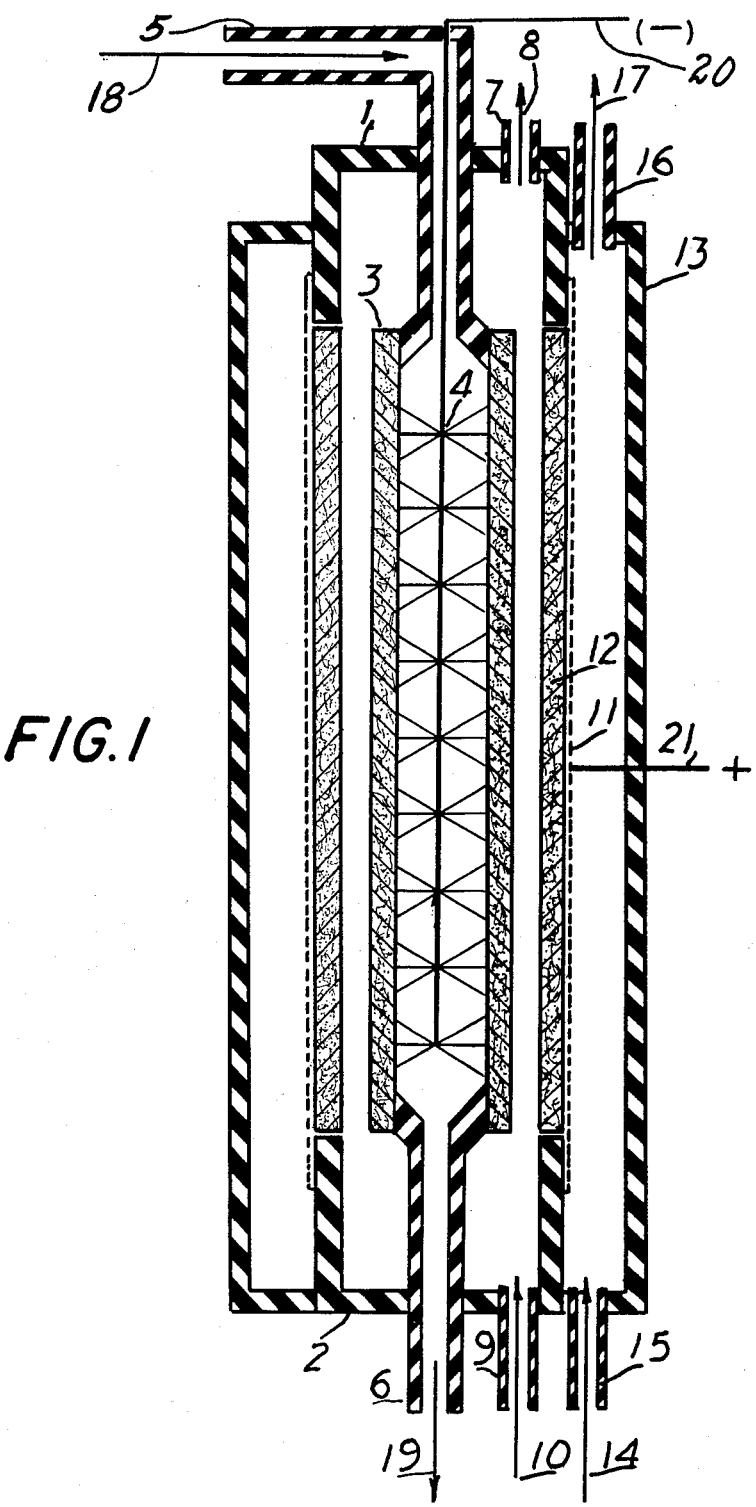
Figure 1
Figure 2:
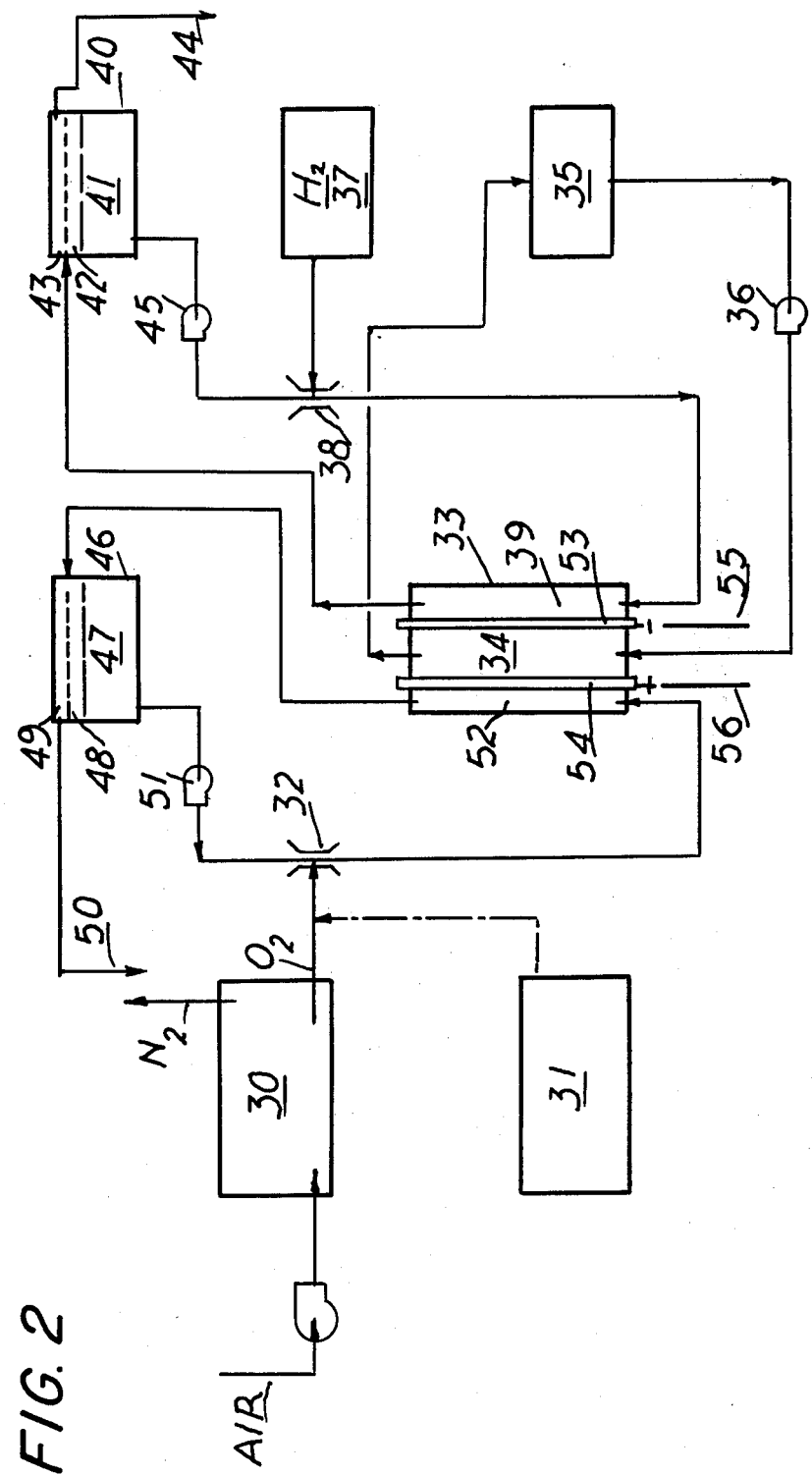

1. Container cap—non conductor
2. Container bottom—non conductor
3. Hydrogen electrode
4. Current collector—Negative electrode
5. Fuel influent line—non conductor
6. Fuel effluent line—non conductor
7. Electrolyte effluent line—non conductor
8. Electrolyte—effluent
9. Electrolyte—influent line—non conductor
10. Electrolyte—influent
11. Current collector—positive electrode
12. Oxygen electrode
13. Liquid oxygen carrier—Liquid container
14. Liquid oxygen carrier—Liquid influent
15. Liquid oxygen carrier—Liquid influent line—non conductor
16. Liquid oxygen carrier—Liquid effluent line—non conductor
17. Liquid oxygen carrier—Liquid effluent
18. Hydrogen containing fuel—influent
19. Hydrogen containing fuel—effluent
20. Negative terminal
21. Positive terminal

DESCRIPTION OF DRAWING

Figure 2

30. Paramagnetic oxygen production—Patent No. 4,049,398
31. Alternate oxygen supply
32. Aspirator or other type mixer to absorb oxygen in carrier liquid
33. Fuel cell
34. Electrolyte
35. Electrolyte quality control and/or reprocessing
36. Transfer and flow control pump for electrolyte
37. Hydrogen fuel (as gas) supply
38. Aspirator or other type mixer to absorb hydrogen in carrier liquid
39. Carrier liquid for absorbed hydrogen gas compartment(s) in fuel cell
40. Separator to remove nonmiscible water from carrier liquid for absorbed hydrogen gas
41. Water free carrier liquid for recycle
42. Carrier liquid for absorbed hydrogen gas and entrained water
43. Carrier liquid free—water—separated for disposal
44. Water to disposal
45. Transfer and recycle pump for carrier liquid for absorbed hydrogen
46. Separator to remove nonmiscible water from carrier liquid for absorbed oxygen gas
47. Water free—carrier liquid for recycle
48. Carrier liquid for absorbed oxygen gas and entrained water
49. Carrier liquid—free water—separated for disposal
50. Water to disposal
51. Transfer and recycle pump for carrier liquid for absorbed oxygen
52. Carrier liquid for absorbed oxygen compartment(s) in fuel cell
53. Hydrogen electrode
54. Oxygen electrode
55. Negative terminal
56. Positive terminal

PREFERRED EMBODIMENT

In order to teach the science and art of improving the fuel cell efficiency the following example is used to provide the means of designing such a fuel cell. The example selected is a hydrogen fuel with oxygen oxidant in a cell operating at 25° C. and with variable pressures in the hydrogen, electrolyte, and oxygen compartments as required to produce as much of the water product as possible in the hydrogen and oxygen compartments, thus controlling the water content of the electrolyte so the electrolyte, selected for this example as (KOH) potassium hydroxide will be retained between 30% and 40%, preferably 30%. This example is based on a cell with one square foot (929 $^2$cm) of both positive and negative electrodes operating at design load of 100 amperes and 1.2 volts vs. the 0.90 to 0.95 volts, until this invention, normal for this type of cell.

This example uses, preferably, a gas diffusion type electrode, that is, a porous electronically conducting wall, for both the oxygen and the hydrogen sides. Normal gas fuel and gas oxidant type cells would be concerned with the balance between the gas pressure and the capillary forces in the porous electrodes. This pressure balance required to prevent excess water vapor being formed in the gas phase and altering the mass transfer ratios; and/or the formation of excess water in the electrolyte, thus diluting it. With preferably, both the hydrogen and oxygen absorbed in an inert, non water miscible, dielectric liquid, the pressure differential between the electrolyte and the fuel or oxidant liquid phases is adjusted to remove all possible water of formation with the fuel and/or oxidant phase inert liquid. Pressure differentials are therefore preferably several inches of water greater with the electrolyte than the fuel side and only sufficiently greater than the oxidant side to, preferably, to saturate the electrode through to the inert liquid but not drive it into the oxygen carrier, inert, nonmiscible liquid.

The normal potential of the oxygen electrode in alkaline solutions is $+0.4$ volts versus the standard hydrogen electrode. According to theory the electrode reaction should be: $O_2 + 2H_2O + 4e^- = 4OH^-$. It has been found however, on carbon/$O_2$ electrodes at room temperature, the greater part of the reaction is: $O_2 + H_2O + 2e^- = HO_2^- + OH^-$ The hydrogen electrode in alkaline solution is expected to react as $$H_2 + 2OH^- = 2H_2O + 2e^-$$

Since hydrogen is not active on untreated carbon electrodes, they are, preferably, coated by depositing a noble metal catalyst on their surface.

Structural configurations of the fuel cell range from simple paired electrode to multi-electrode with their respective advantages. Also from concentric cell to parallel plates. Since all the configurations are adaptable to the use of a gaseous fuel absorbed in an inert, dielectric carrier liquid; and also equally adaptable to the use of the oxygen provided not in a gaseous phase, but absorbed in an inert, dielectric liquid; those versed in the art and science of fuel cells will have no difficulty in selecting a specific configuration for their specific design.

Most low temperature, less than boiling of an aqueous electrolyte, fuel cells have found potassium hydroxide solution the most usable. Preferably, due to the conductivity, a 30% solution is used. Sodium hydroxide is also a commonly used electrolyte.

The following table provides design data for selection of strength of electrolyte use.

PROPERTIES OF KOH SOLUTIONS

| Wt. % @ 15° C. | Density gm/ml 15° C. | Resistivity OHM cm 18° C. | Resistivity T-COEFF | Viscosity 18° C. | CP 60° C. |
|---|---|---|---|---|---|
| 10 | 1.092 | 3.20 | 0.0187 | 1.30 | 0.58 |
| 20 | 1.188 | 2.00 | 0.0196 | 1.72 | 0.82 |
| 30 | 1.290 | 1.84 | 0.0220 | 2.50 | 1.18 |
| 40 | 1.399 | 2.20 | 0.0267 | 4.0 | 1.80 |
| 50 | 1.514 | 3. | — | 9.2 | 3.2 |

Those versed in the art and science of fuel cells will have no difficulty selecting an acidic or alkaline electrolyte and strength for a specific design using an inert dielectric carrier liquid for either or both the fuel and oxygen.

Water produced is 0.33 grams per amp-hour; therefore the 100 amp. cell example herewith will produce 33 grams/amp-hour. By pressure differential control this will be produced at the interface of the hydrogen electrode and as formed be displaced by nonmiscible inert dielectric liquid. The water so formed will rise to the surface or sink to the bottom depending on specific gravity of the dielectric liquid selected. For this example the dielectric liquid is preferably a halogenated hydrocarbon such as $(C_4F_9)_3N$ with a specific gravity of 177#/Ft.$^3$ (1.88 g/cm$^3$); $-58°$ F.($-50°$ C.); and dielectric constant of 1.90 with a dielectric strength of 56 KV per 0.10″GAP (56 KV per 2.54 mm GAP); and an average molecular weight of 670. In addition, be non-flammable, non-explosive and essentially non-toxic.

Although the example outlines with a certain degree of completeness the specifications for the selected dielectric lquid; there are many such compounds both as polyorganosiloxanes and halogenated hydrocarbons or fluorocarbons those versed in the art and science of dielectric liquids will have knowledge of and thus no difficulty in selecting for use as the absorber-carrier liquid for either the oxygen gas or the gaseous fuel selected.

Solubility of the $(C_4F_9)_3H$ selected herein for a one cell example, when provided for example 0.00333 grams (0.0001383 pounds) per minute preferably hydrogen gas; requires 49.0147 grams (0.10048#) per minute. Similarly, when providing for example 0.02667 grams (0.0012#) per minute of preferably oxygen gas, requires 98.05 grams (0.201#) per minute of dielectric liquid also, preferably $(C_4F_9)_3N$ (per each cell).

The example herein has taught the art and science of a single cell, low temperature, low pressure, alkaline electrolyte, porous carbon electrode, oxygen gas oxidant, hydrogen gas fuel type cell as improved by immersing the electrodes with hydrogen gas saturated and oxygen gas saturated inert, dielectric liquids. The example was illustrated in this manner. For the design of a 120 volt D.C. system, 100 of the individual cells are placed in series; thus providing a 120 volt-100 amp system.

This system is operated by preferably using an on site oxygen production system (30) which paramagnetically separates from air 2.667 grams or 0.12 pounds per minute. Alternatively, commercial oxygen is provided in similar amount. It is possible to separate the oxygen saturated dielectric liquid adjacent to the magnetic poles of the paramagnetic oxygen production apparatus and service the fuel cells oxygen compartment (52) direct with said dielectric liquid. More positive control, preferably, is by production of gaseous oxygen and then absorbing (32) it in recirculated (51) dielectric liquid (47). The oxygen saturated dielectric liquid is pumped through the 100 cell in a parallel manner at the rate of 20.10 pounds per minute. The dielectric liquid is, preferably, recycled up through the individual cells thus removing any water formed out of the cell to dielectric liquid reservoir (47) and water separator apparatus (46) where the water as it rises (48) (49) and the dielectric liquid settles (48)(47); is decanted (49) and removed to disposal (50). Pressure on the oxygen saturated dielectric side of the individual cells is adjusted by controls and valves (not shown) such as pump (51) to allow liquid electrolyte to just penetrate the porous electrode (54); but not permit weepage and loss of liquid to the dielectric liquid chamber (52). Water of chemical reaction which forms at the interface of the electrode and the oxygen saturated dielectric liquid is carried up through the cell for separation (46) and disposal (50).

Although liquid fuels such as ethanol, methanol, and etc. can also be used; in order to further teach the art and science of the use of absorbed gases in a liquid dielectric; this example, preferably, uses hydrogen as its fuel. The hydrogen gas (37) in the amount of 0.01383 pounds or 0.0333 grams per minute is absorbed (38) in 0.10048 pounds or 49.0147 grams per minute of the dielectric liquid by recirculation with pump (45) the dielectric liquid from reservoir (41) at the water separator apparatus (40). The hydrogen saturated dielectric liquid is preferably passed up through its cell compartment (39) so as to remove water of formation. The pressure of the dielectric liquid in compartment (39) is adjusted by valves and controls (not shown) and pump (45) to just permit the electrolyte to saturate the porous electrode (55) so most water of reaction will occur at the interface of the electrode and the inert, dielectric liquid, saturated with hydrogen gas. The upflow of the recirculated dielectric liquid thus removes the nonmiscible water of reaction calculated to be 0.12 pounds per minute to the dielectric reservoir (44) and water separator apparatus (40) where the rising water (42)(43) is floated; then decanted (43) to disposal (44); with the settling dielectric liquid (42)(41) is stored until recycled by pump (45). The electrolyte, preferably, in this example a 30% (KOH) potassium hydroxide solution is recirculated through chamber 34, in parallel, of all cells; thus exposing (1) sq. foot, (929 $cm^{-2}$) per cell of both the hydrogen and oxygen electrodes to the electrolyte.

The pressure of the electrolyte is adjusted by valves and controls (not shown) and recirculation pump (36) to act in concert with the pressures of the hydrogen gas and oxygen gas, carrier liquids, as above specified. Quality control of the 30% potassium hydroxide electrolyte is controlled by removing water, adding water, and adding KOH, as required at laboratory controlled (not shown) treatment facilities (35).

Those versed in the operation art and science of fuel cells will have no difficulty in adjusting the cell compartment pressures as specified above. Electrical controls of a bank of fuel cells has not been illustrated for the same reason. Voltage regulation of a bank of fuel cells is not a problem as large current changes, that is from 25ma/$cm^2$ to 100ma/$cm^2$ cause voltage changes of less than (10) ten percent. Thus it may be seen that by absorbing the reactants of a fuel cell, such as hydrogen or other gaseous fuel, and oxygen; in an inert, dielectric liquid then submerging the cell electrodes with said reactants saturated liquid, the efficiency of conversion of chemicals directly to electrical energy is enhanced; and the hazzard of explosion eliminated.

While the invention has been described in a certain degree of particularity, it is understood that the disclosure has been made by way of example and that changes in detail of cell configuration, as well as temperature, pressure, electrode composition and materials of construction, and electrolyte materials, may be made without departing from the spirit thereof.

What is claimed is:

1. An improvement in the process of production by electrochemical direct conversion of chemicals to electric energy consisting of the steps of;

absorbing oxygen gas in an inert dielectric liquid which is also immiscible with water, replacing the dry gas compartment fluid of a conventional fuel cell with the oxygen saturated dielectric liquid, adjusting the pressure differential between the electrolyte compartment and the oxygen carrier liquid compartment so electrolyte wets porous electrode but doesn't leak to oxygen carrier compartment, circulating the oxygen saturated, inert dielectric liquid through the cell compartment which is for the oxygen contact with the oxygen electrode, carrying water of reactions from the cell with the dielectric to a waste separator, gravity separating the water from the dielectric liquid, disposing of the water, recycling the dielectric liquid, replenishing the electrolyte with controlled quality, specified electrolyte, recycling the electrolyte through quality control, providing a fuel to the cell which produces an E.M.F. across the cells electrodes and terminals, said fuel being either a liquid naturally, or absorbing said fuel, if gases, in an inert dielectric liquid, recirculating said fuel through the fuel compartment of the cell, replenishing said fuel as required for continuous E.M.F. production, connecting individual cells in series to amplify the individual cell voltage to a predetermined quantity, separating the water of reaction, disposing of the water.

2. The process of claim one including the absorbing gaseous fuels in an inert dielectric liquid, recycling the fuel saturated dielectric liquid through the fuel or hydrogen compartment of the cell, carrying the nonmiscible water from the cell to a separator, separating the water from the dielectric liquid, disposing of the water, recycling the dielectric through a mixing device, saturating the dielectric liquid with gaseous fuel recycling through cell.

3. The process of claim one (1) including the use of off site provided oxygen as the source of oxygen.

4. The process of claim one (1) including the safety of non explosive fuels and oxidant combinations.

* * * * *